United States Patent
Koski (10) Patent No.: US 8,566,180 B2
(45) Date of Patent: *Oct. 22, 2013

(54) METHOD AND SYSTEM FOR REPRESENTING USER ACTIVITY IN AN ONLINE STORE

(75) Inventor: David A. Koski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 12/637,460

(22) Filed: Dec. 14, 2009

(65) Prior Publication Data

US 2010/0094730 A1 Apr. 15, 2010

Related U.S. Application Data

(63) Continuation of application No. 11/541,071, filed on Sep. 29, 2009, now Pat. No. 7,660,749.

(51) Int. Cl.
*G06Q 30/00* (2012.01)

(52) U.S. Cl.
USPC .......................................... 705/27.2; 705/26.9

(58) Field of Classification Search
USPC ................................ 705/21.6–27.2; 715/706
See application file for complete search history.

(56) References Cited

U.S. PATENT DOCUMENTS

| | | | | |
|---|---|---|---|---|
| 5,937,391 | A * | 8/1999 | Ikeda et al. | 705/14.23 |
| 7,660,749 | B2 * | 2/2010 | Koski | 705/26.8 |
| 2002/0178072 | A1 * | 11/2002 | Gusler et al. | 705/26 |
| 2004/0148226 | A1 * | 7/2004 | Shanahan | 705/26 |
| 2005/0177463 | A1 * | 8/2005 | Crutchfield et al. | 705/27 |
| 2005/0261987 | A1 * | 11/2005 | Bezos et al. | 705/27 |
| 2006/0122895 | A1 * | 6/2006 | Abraham et al. | 705/26 |
| 2006/0122917 | A1 * | 6/2006 | Lokuge et al. | 705/27 |
| 2007/0288627 | A1 * | 12/2007 | Abella et al. | 709/224 |

OTHER PUBLICATIONS

"Mapquest Find Me". Business Wire. New York. Oct. 3, 2005. p. 1.*

* cited by examiner

*Primary Examiner* — William Allen
(74) *Attorney, Agent, or Firm* — Novak Druce Connolly Bove + Quigg LLP (57) ABSTRACT

Representing activity in an online store is disclosed. Information associated with the activities of a second visitor to the store is received. An indication of the presence of a first visitor at the store is also received. The activities of the second visitor are displayed to the first visitor.

20 Claims, 10 Drawing Sheets

ACME STORE – Electronics – MP3 Players – iPod nano 2GB | Help

Foot Traffic: 70% of site visitors looked at this page today. — 402

Neighbors: 4 other people are looking at this product with you. — 404

People with this item in their cart — 406

SEARCH — 104 iPod nano 2GB
Price: $149.99
Add to Cart

Features:

User comments:

Books
- Fiction
- Non Fiction

Music
- Classical
- Pop / Rock
- R&B / Jazz
- Electronica

Movies
- New Releases
- Action
- Drama
- Children's

Software
- Games
- Educational
- Productivity

Electronics
- Computers
- MP3 Players
- Cameras
- Accesories

METHOD AND SYSTEM FOR REPRESENTING USER ACTIVITY IN AN ONLINE STORE

CROSS REFERENCE TO OTHER APPLICATIONS

This application is a continuation of co-pending U.S. patent application Ser. No. 11/541,071, entitled ENHANCING ONLINE SHOPPING ATMOSPHERE, filed Sep. 29, 2006 which is incorporated herein by reference for all purposes.

BACKGROUND OF THE INVENTION

The goals of both online shops and physical stores are generally the same—facilitating the purchase of goods and services by customers. In some cases, online shopping offers advantages over shopping in a physical store. For example, online shops are often open continuously, whereas most physical stores have set hours. Online shoppers are also able to leverage features such as search functionality while physical shoppers are not. However, one drawback of online shopping is that the experience can feel sterile and isolating. Customers in such an environment may be less likely to have positive feelings about the online shopping experience, may be less inclined to engage in the online equivalent of window shopping (e.g., will not linger in front of a display), and may ultimately spend less money than their counterparts who shop in physical stores.

Therefore it would be desirable to improve the experience of online shopping.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
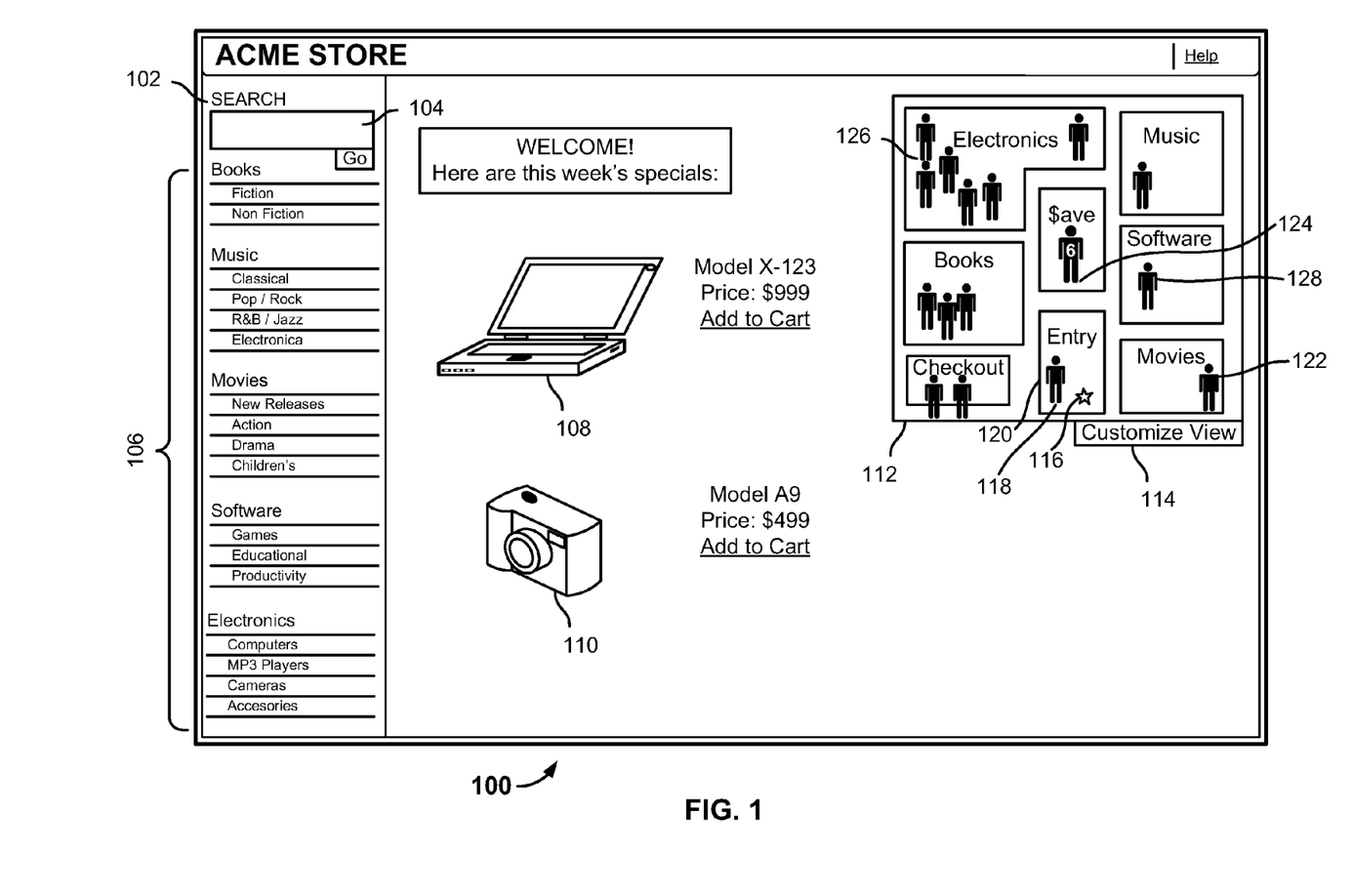
FIG. 1 illustrates an embodiment of an interface to an online store.

FIG. 1 illustrates an embodiment of an interface to an online store. The example shown is an implementation of the front page of a website, as rendered in a browser of a visitor (known herein as "Alice"). As described herein, the Acme Company has both physical retail stores (also referred to herein as brick-and-mortar stores), and maintains an online storefront. Interface 100 includes a sidebar 102 that provides access to various site features. For example, by entering text into region 104, a visitor can search the site for products. Visitors can also browse for products by selecting from the categories and subcategories displayed in region 106.

Also shown on the front page of the store is an assortment of featured products (108, 110). Region 112 is presented in this example as a representation of the physical layout of a typical Acme brick-and-mortar store. The layout presented in region 112 may also be stylized (e.g., if the brick-and-mortar stores have complex layouts) or the information presented in the region may take a different form, as explained in more detail below. For example, a web store that does not make use of a category based hierarchy may nonetheless be subdivided by search terms appearing on site pages, tags, etc. A user visiting this site may also customize the view presented in region 112 by selecting region 114, by adjusting account settings, and/or as part of a first time visitor dialogue. The information displayed in region 112 and the form it takes may vary depending on such factors as how Alice arrived at the site (e.g. by direct entry of the URL, by following a hyperlink, were being directed by a search engine) and which portion of the website Alice is currently viewing.

In the example shown, Alice is represented in region 112 by star icon 116. Other visitors to the site are represented by human shaped icons such as icon 118. Both Alice and one other visitor (118) are currently viewing the main page of the Acme website. They are represented by icons in entryway 120 accordingly. Other visitors are viewing other portions of the website. For example, visitor 122 is currently browsing movie related pages of the Acme store. User 124 is browsing software, and so on.

When multiple visitors are browsing in the same location of the store, that information can be conveyed through region 112 in a variety of ways. For example, region 124 represents the bargain basement area of the Acme store. Six visitors are currently browsing products there as indicated by the number appearing on the chest of the human icon shown in that area. A plurality of visitors to the electronics area of the site is represented in region 126 by displaying one icon for each visitor, in this case, also a total of six. The concentration of visitors in an area can also be represented by using different icons to represent different ranges rather than or in addition to displaying absolute number of visitors. For example, one to ten visitors may be represented by a single person, 11 to 20 visitors may be represented by two people, and more than 20 visitors may be represented by a cloud shape, or a small group of people with their hands in the air.

In the example shown, region 112 is embedded in a webpage along with the other regions (102, 106, etc.). In some embodiments, region 112 is a popup displayed in a separate browser window or is rendered by a helper application/browser plug-in.

Figure 2:
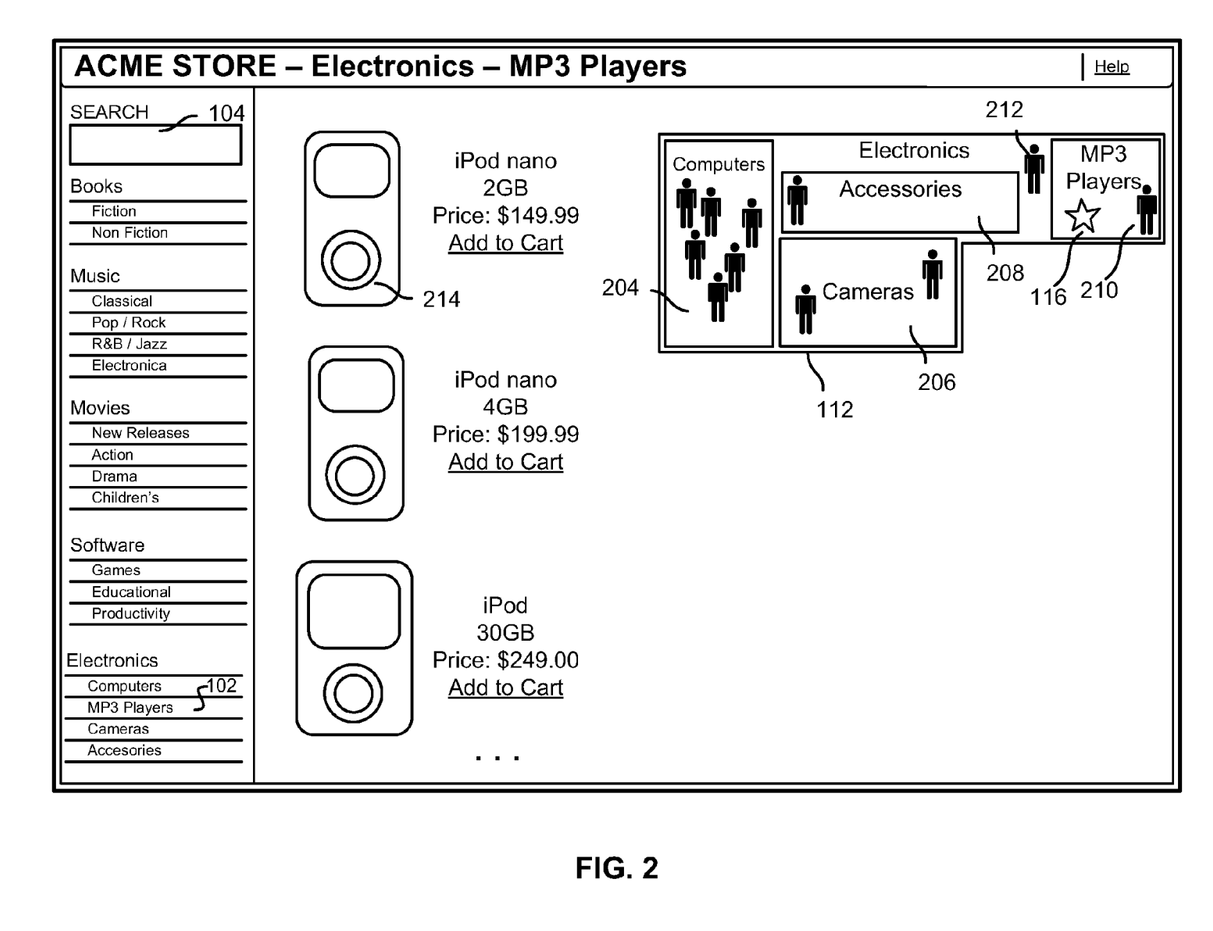
FIG. 2 illustrates an embodiment of an interface to an online store.

FIG. 2 illustrates an embodiment of an interface to an online store. The example shown is an implementation of a product category page, as rendered in a browser. On this page, Alice is presented with the option of learning about different MP3 players (such as player 214) and adding them to her cart for purchase.

In this example, region 112 includes an expanded view of the electronics department layout. Each of the sections of the electronics department (Cameras, MP3 players, Computers, and Accessories) is shown, along with a representation of the visitors currently visiting each of those areas.

Alice arrived at this page by selecting the MP3 player subcategory of the Electronics category in region 102 and is shown by star icon 116. Alice could also have arrived at this page by entering a search term of "MP3 player" into region 104.

From the information shown in region 112, Alice can see that the bulk of the people currently "in" the Electronics department are interacting with Computer related pages (204), with fewer people in the Camera section (206) and Accessories section (208), respectively. There is also one other person (210) currently looking at MP3 players, and one on the main page of the Electronics department (212).

In some embodiments, visitors such as Alice can obtain additional information by interacting with region 112. For example, if Alice hovers her mouse over a section with further categories (such as Computers or Accessories), Alice may see a breakdown of how visitors to those sections are subdivided.

Figure 3:
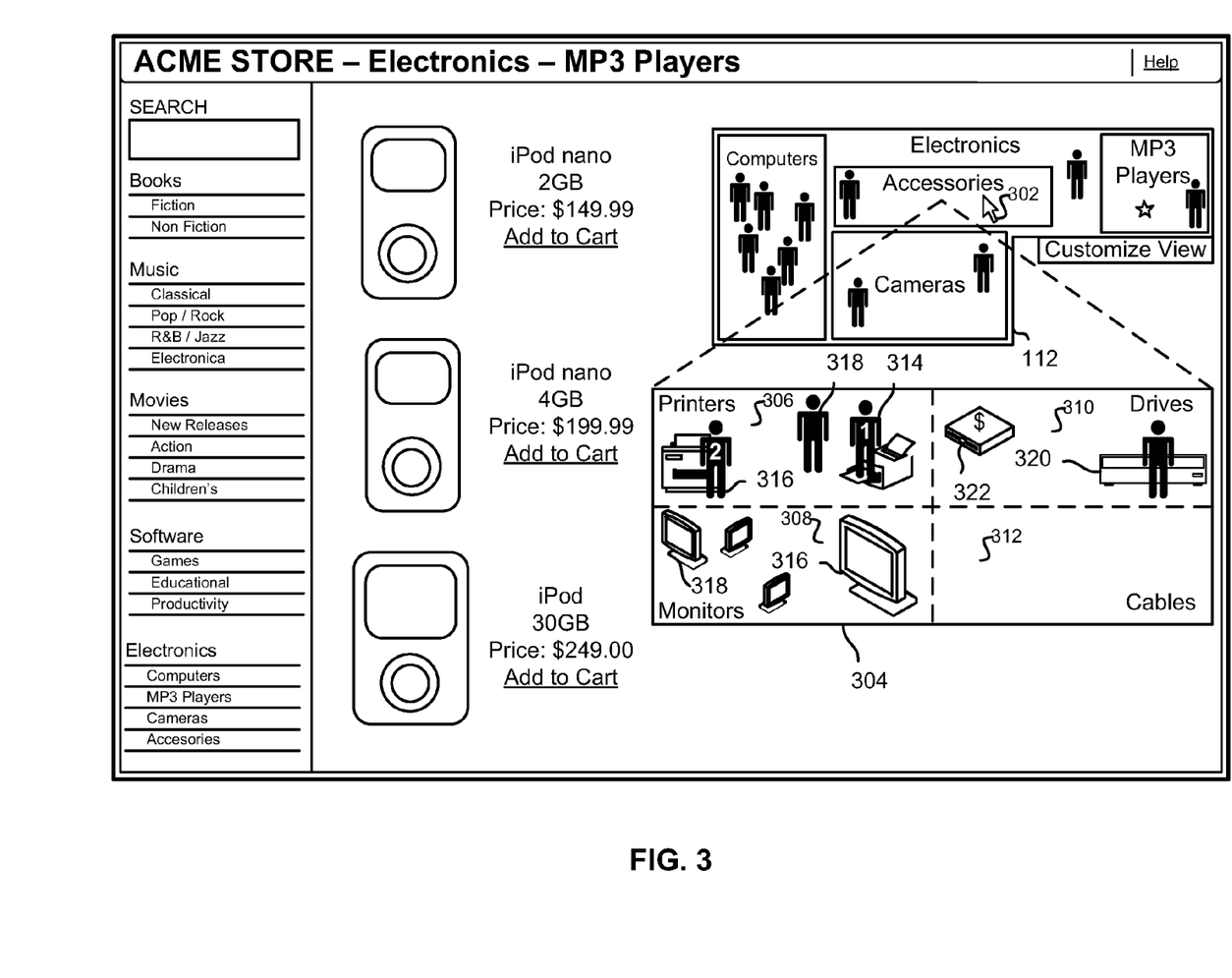
FIG. 3 illustrates an embodiment of an interface to an online store.

FIG. 3 illustrates an embodiment of an interface to an online store. In the example shown, Alice has clicked her mouse on the Accessories section of the electronics department (302). In so doing, each of the subsections of the Accessories section (Printers, Monitors, Drives, and Cables) is revealed as an overlay 304. Included in FIG. 3 are indications of how other visitors are interacting with the Accessories section presented in a variety of ways. In some embodiments, the information in region 112 (or associated areas such as flyout 304) is presented a uniform fashion. In other embodiments, what information is presented and/or how that information is presented is customizable and may depend on a variety of factors such as the nature of the category, the nature of the information being presented, the number of visitors, and site policy (e.g., privacy policies, etc.). In each of the examples shown in region 304, an abstraction of the number of visitors interacting with a particular portion of the website is shown rather than the precise number of those visitors. Nonetheless, Alice is able to have a sense of the presence of other site visitors and what they are doing.

In region 306, a product image of the most popular printer (the one with the most people viewing it, in this example) is shown accompanied by icon 314 with a "1" (for "1$^{st}$ most popular") indicated on its chest. The second most popular printer is similarly indicated at 316. That other people are browsing through printer offerings but not looking at either of the top printers is indicated by icon 318.

In region 308, the product images of several monitors are presented. The size of the product image indicates the number of visitors currently viewing that monitor's product information (e.g., via a page dedicated to that monitor). In the example shown, monitor 316 is the most popular (has the most people currently viewing it). Monitor 318, shown slightly smaller than monitor 316 is the second most popular, and so on. In some embodiments, thresholds (such as "at least 5 visitors" or "only the three top products per category") are used to determine how many products to show in a region such as region 308 for example so that a visitor such as Alice isn't overwhelmed by too much or confusing information.

In region 310, the product images of two drives are presented. In this example, icons indicate how visitors are interacting with the products. For example, the product image of drive 322 has a dollar sign on it. This indicates that out of all of the drives offered for sale at the Acme website, drive 322 is in the most shopping carts. However, drive 320 currently has the most visitors as indicated by the presence of the human icon superimposed on the top of its product image. Other symbols or combinations of symbols can be used to indicate the status of products in other ways as applicable. For example, a product that has recently had a review left for it may be indicated by a question mark icon.

In region 312, the lack of any icons indicates that no one (or very few people, depending on implementation) is currently interested in cables. As described in more detail below, in some embodiments, what interactions visitors are making with which aspects of the store are updated in real time, including by use of animation. So, for example, if a visitor with drive 322 in his shopping cart decided to shop for a USB cable, some indication that the visitor had moved from shopping for a drive to shopping for a cable would appear in region 312.

Figure 4:
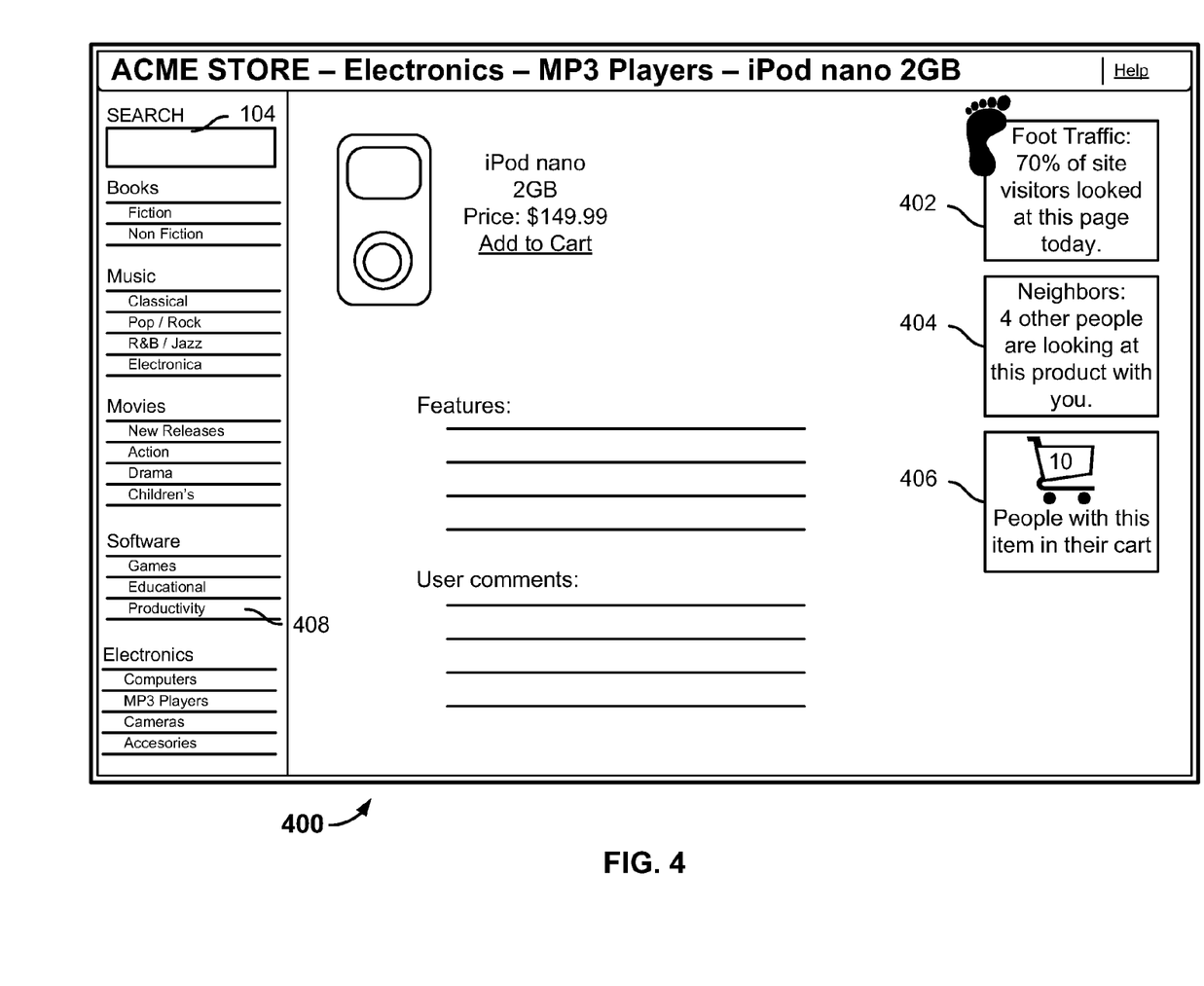
FIG. 4 illustrates an embodiment of an interface to an online store.

FIG. 4 illustrates an embodiment of an interface to an online store. Alice arrived at the example shown by clicking on MP3 player 214 in FIG. 2. Alice could also have arrived at this page by entering "iPod nano" into region 104, or by interacting with region 112, such as is shown in FIG. 3.

Regions 402, 404, and 406 each convey information about how other visitors have previously or are currently interacting with the particular product that Alice is viewing, the iPod nano 2 GB. In some embodiments, region 112 is omitted and one or more regions such as 402-406 is included in an online store. In other embodiments regions such as 402-406 accompany region 112 on the same page or are located on different portions of a website as applicable.

In the example shown, region 402 indicates the foot traffic that an area of the site has gotten over a certain time period. The region indicates that 70% of the visitors to the Acme site in the last 24 hours visited the iPod nano 2 GB page.

Region 404 is a textual indication to Alice that in addition to her, four other visitors are currently looking at the iPod nano 2 GB page.

Region 406 indicates that ten people, irrespective of what they are currently doing on the site (e.g., looking at printers), have the iPod nano 2 GB in their carts. In some embodiments, Alice can interact with the information shown in regions 402-406. For example, if Alice would like to see what other products people with an iPod nano 2 GB have in their cart, she may be able to determine that by clicking on region 406 or selecting it as an option from a context menu.

In some embodiments, messages such as are included in regions 402-406 may be presented to users when interacting with other features of a website. For example, if Alice hovers her mouse over region 408, she may be presented with an indication of the number of people currently looking at productivity software, the percentage of people site-wide with productivity software in their carts, etc. Alice's own information may also be combined with the information of other visitors, e.g., to inform her of the number of people currently looking at productivity software that previously looked at iPods (what Alice is doing now). If Alice arrived at the page via a search, Alice may also see information such as what other people who used similar search terms have in their carts, and in which parts of the store people who used search terms like her are currently located (e.g., after having looked at the page she is currently looking at).

Indicators such as sounds can also be used to convey information such as is shown in regions 402-406. For example, whenever Alice visits a particular product page, she may hear varying degrees of din depending on the number of other visitors simultaneously viewing the page. If there are few or no other visitors, no sound may be played. If there are a medium number of simultaneous visitors, a low murmuring may be played. If there are a large number of simultaneous visitors, a louder chatter or some other sound may be played.

Information shown in regions 402-406 can also be used in conjunction with contests or other promotions. For example, Alice might be instructed to "follow the footsteps" of other visitors (visit the page that viewers of page 400 subsequently visited) to receive a discount.

Figure 5:
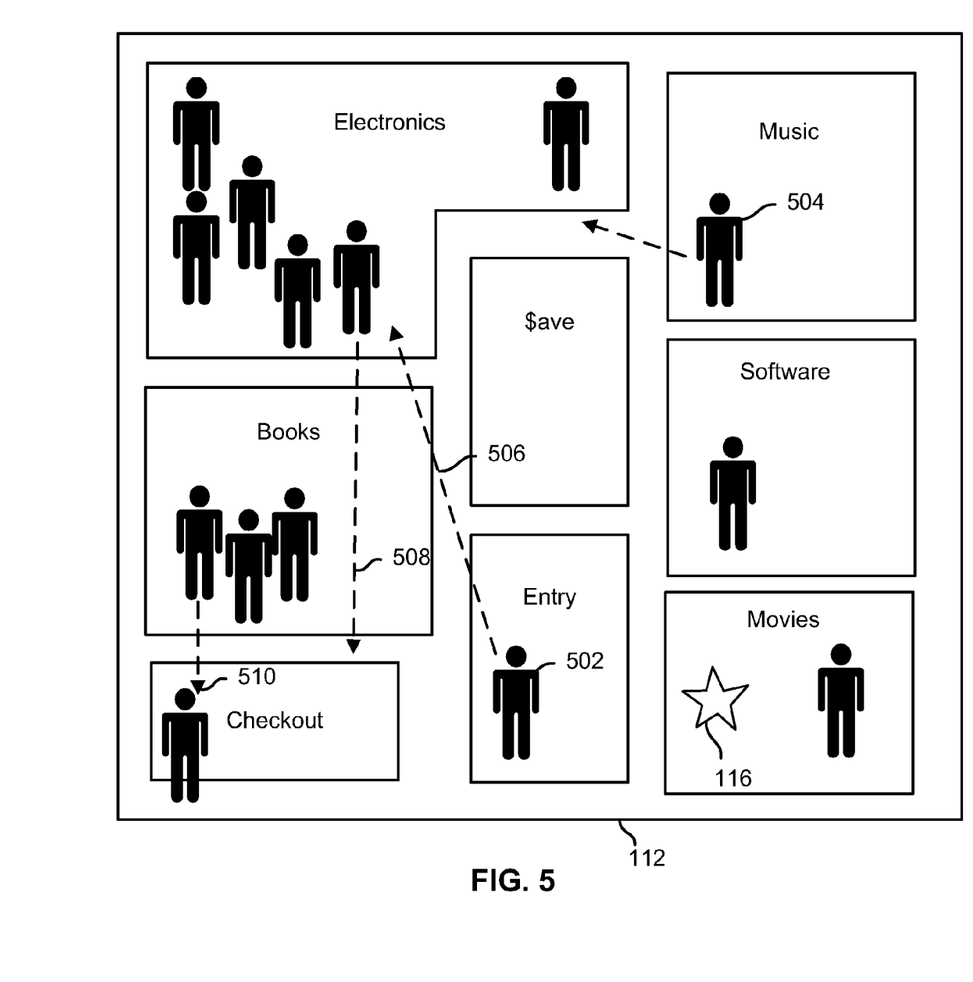
FIG. 5 illustrates an embodiment of an interface to an online store.

FIG. 5 illustrates an embodiment of an interface to an online store. The example shown is an implementation of region 112 of FIG. 1 as rendered in a browser. In this example, the representation of visitors currently visiting the website includes animation. Suppose visitor 502 was recently on the main site page and either browsed to the Electronics area or searched for a product that is located in the Electronics area. This movement is represented in region 112 by icon 502 floating across the display in the direction of arrow 506. Similarly, visitor 504 was recently in the Music section and has also moved to the Electronics area. Arrows 508 and 510 indicate that the users associated with those arrows are about to or in the process of paying for the items in their shopping carts. In some cases, such as where bandwidth or system resources may be limited, rather than animating the movement of icons in real time, updates occur on a periodic basis such as every 5 minutes, and/or motion is indicated by rendering arrow 506 instead of having icon 502 traverse the screen.

Alice can also interact with region 112 such as by right clicking on one of the visitor icons (e.g., 502) and selecting an option to "go where that visitor is going" or "see where they're going" (without being taken there). Alice can also pose questions to particular users and ask why they left the previous page, why they went to the current page, etc. and might learn, for example, that a new product was just announced.

Figure 6:
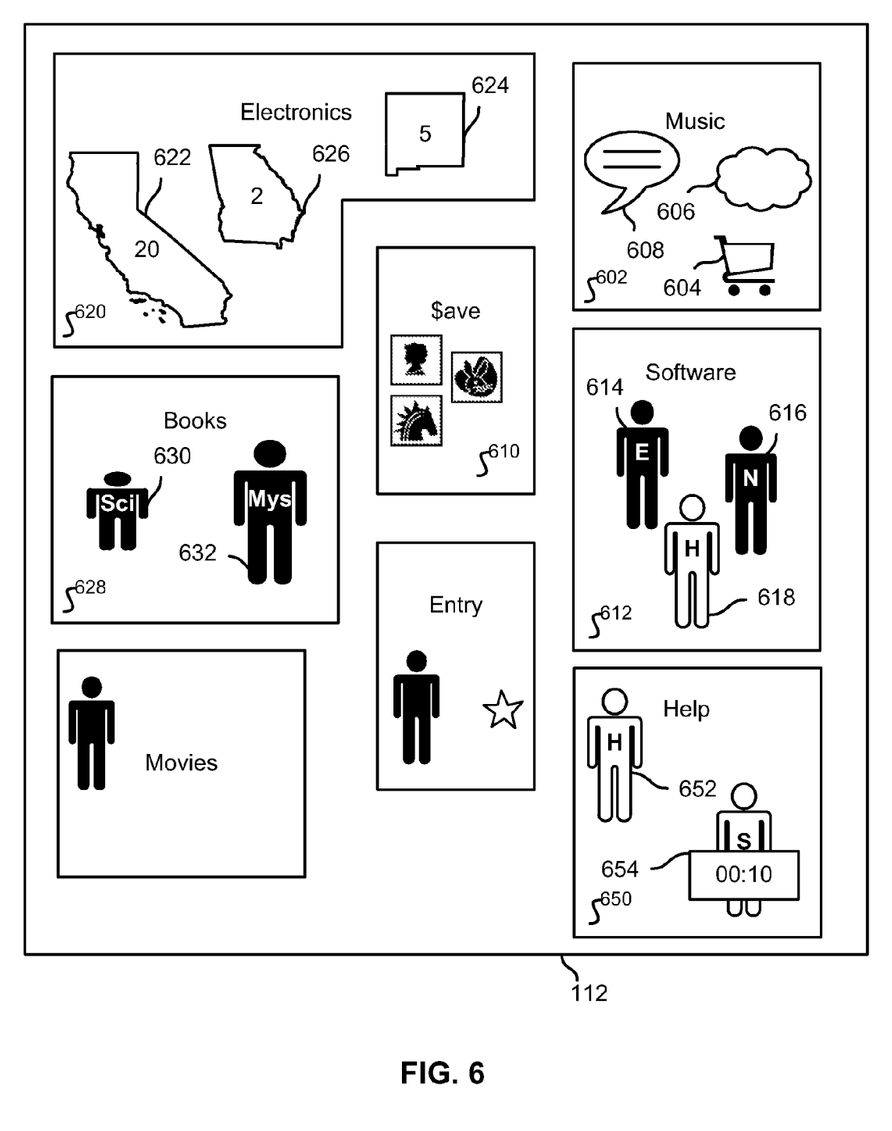
FIG. 6 illustrates an embodiment of an interface to an online store.

FIG. 6 illustrates an embodiment of an interface to an online store. The example shown is an implementation of region 112 of FIG. 1 as rendered in a browser. Included in FIG. 6 are indications of how other visitors are interacting with the Acme site presented in a variety of ways. In some embodiments, the information in region 112 is presented in a uniform fashion (e.g., the same set of icons is used for each section of the store). In other embodiments, what information is presented and/or how that information is presented is customizable and may depend on a variety of factors such as the nature of the information being presented and site policy.

The music portion of the Acme store is represented in region 602. Visitors to the music category are indicated by the type of their most recent action. In the example shown, user 604 is represented as a shopping cart, indicating that that user has recently placed music in his cart. In some embodiments, Alice can interact with the icons, such as by looking inside the cart to see what user 604 is buying. User 606 is represented as a cloud, indicating that that user has recently listened to music samples. Alice can hover over the cloud and see what song user 606 previewed. User 608 is represented as a comment bubble, indicating that that user has recently written a review of an album. The creation of other user-generated content may also be indicated, such as a recommendation of a set of products to be used as a group, a comparison of a set of similar products, etc. In some embodiments, Alice can customize what information is shown in region 602 such as by specifying that she is uninterested in knowing about when people listen to songs but would like anyone writing a review in a particular genre or of a particular band to be displayed in a prominent fashion.

As the users in region 602 take other actions, their icons are updated accordingly to reflect their new actions, such as cart 604 increasing in size as more items are added to it or turning into a dollar sign as user 604 checks out. In some embodiments, the icons shown in region 602 represent the aggregate actions of groups of users instead of individual users. In such case, the size of the icons can be used to indicate how recently that particular type of action was taken and/or how many other users are engaged in the same activity.

In region 610, visitors are represented by avatars selected by those visitors, rather than a more generic or uniform icon.

In region 612, representations of visitors include an indication of the sophistication of that visitor. For example, user 616 has an "N" superimposed upon him to indicate that he is a new user or "newbie." User 614 has an "E" indicating that she is an expert. Similarly, user 618 is a salesperson that can offer help as indicated by the "H" on his chest. In some embodiments, visitors (and employees such as site technical support or customer service representatives) have "nametags" that indicate the type of expertise that they possess. For example, visitors may be encouraged to "ask me about jazz music" or "ask me about photo software." Particular types of users can be shown or hidden so that Alice can request to see, e.g., experts currently in software if she needs a recommendation, or newbies currently in software if Alice is interested in offering her advice to them (e.g., if she notices that they are spending a long period of time on a particular page—perhaps unsure of what to buy).

In region 620, representations of visitors are shown as an indication of their geolocation. At 622 it can be seen that there are currently 20 Californians browsing the Electronics section. At 624 it can be seen that there are currently five New Mexicans browsing, and at 626 it can be seen that there are currently two Georgians visiting. If Alice hovers her mouse over a state, such as California, she is presented with a variety of aggregate information on, e.g., what Electronics page is most popular among the Californians currently visiting the section. In some embodiments, Alice can drill down into a state by clicking the state, to see, for example, users within a particular metropolitan area. In some embodiments, Alice can specify to limit the activity she is shown in region 112 to one particular geographic area or set of areas. For example, suppose Alice lives in a rural area. She could specify that she only wants to see activity from visitors visiting from San Francisco and/or New York City. Alice can thus have the shopping experience of being in a "cool" and trendy locale without leaving her home. Similarly, if Alice wants a homier experience, she could limit the activity she is shown by limiting it to her county.

In region 628, visitors are shown emblazoned with their favourite genre of book. Alice can ask visitors to region 628 for recommendations in part by selecting a visitor who is familiar with and fond of a particular genre. The icons shown in region 628 also include an indication of the age of the visitor. User 630 is a teenager (interested in Science books) while user 632 is an adult (interested in Mysteries). Other demographic information associated with visitors may also be conveyed in region 112 as applicable.

In some embodiments, the textual indicator (e.g., "Sci") indicates what type of book that visitor is currently viewing, instead of or in addition to a favorite genre (e.g., user 632 is an adult browsing the Mystery section).

Typically, users are able to opt in or out of being shown—at least in a manner other than as a part of an aggregate. For example, in Alice's profile, Alice is able to specify that she's willing to be contacted by other visitors to answer questions about her knowledge of printers, but is not interested in being contacted by other visitors about her taste in music.

In region 650, the availability of a salesman or other help is indicated. Employee 652 is available to assist the first person who requires assistance and Alice can request help from employee 562 by right clicking on his icon. User 654, however, will not be available to assist anyone for ten minutes as indicated by the superimposed clock. In some embodiments, the specialty of the help is indicated, e.g., employee 652 can offer general help as indicated by the "H" on his chest. Employee 654, however, is especially trained to provide assistance with respect to shopping for software as indicated by the "S."

In various embodiments, other design elements such as color are used to indicate a variety of demographic or other information associated with visitors. For example, the length of time that a person has been in the store may be rendered as a color.

Figure 7:
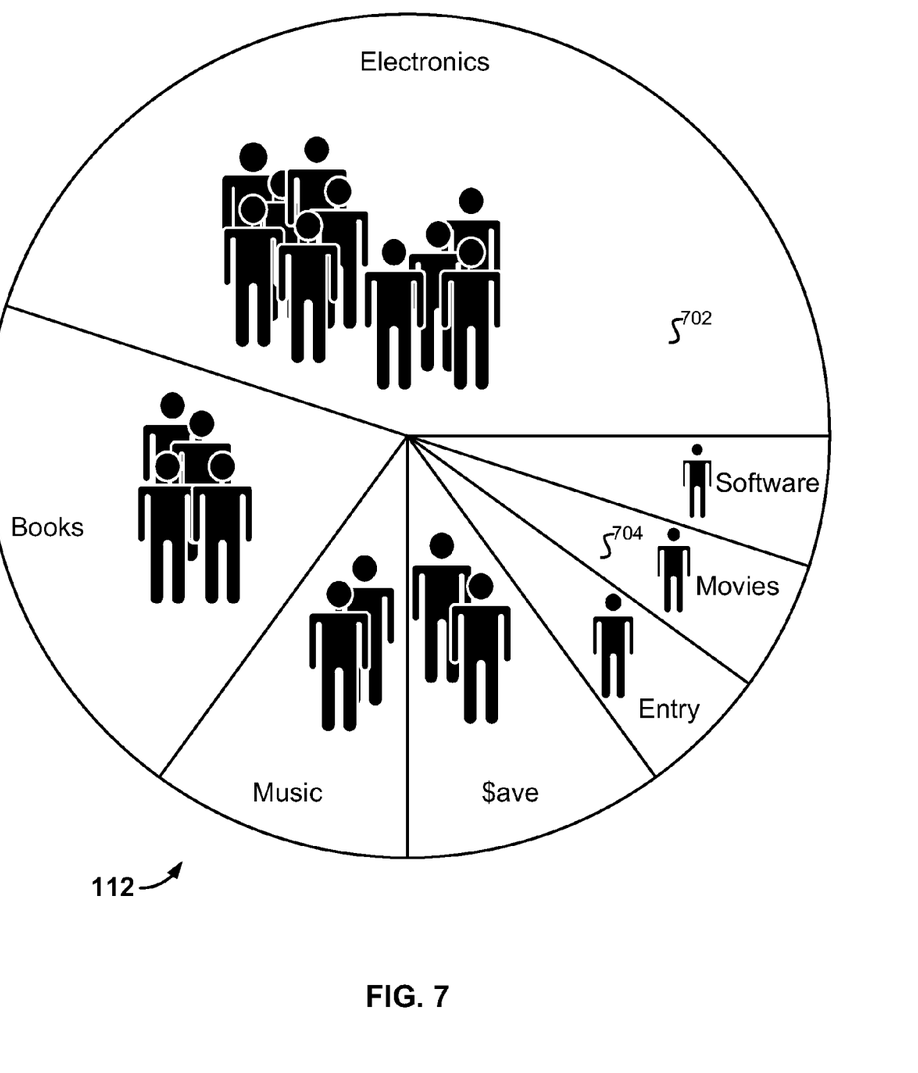
FIG. 7 illustrates an embodiment of an interface to an online store.

FIG. 7 illustrates an embodiment of an interface to an online store. The example shown is an implementation of region 112 of FIG. 1 as rendered in a browser. The chief sections of the Acme web store are presented in region 112 in this example as a pie chart. The sizes of the slices of the pie correspond to the percentage of current total visitors to the site that are "in" each of those sections. For example, nearly half of the Acme website's visitors are currently interacting with pages in the Electronics section (702). Fewer visitors are in the Movies section (704). As visitors move from one section of the store to another, the pie slices shrink and grow as applicable. Similarly, different icons may be used to indicate different types of visitors or the activities in which they are engaged, and Alice can obtain additional information about visitor activity by, e.g., hovering her mouse over a particular region of region 112.

Figure 8:
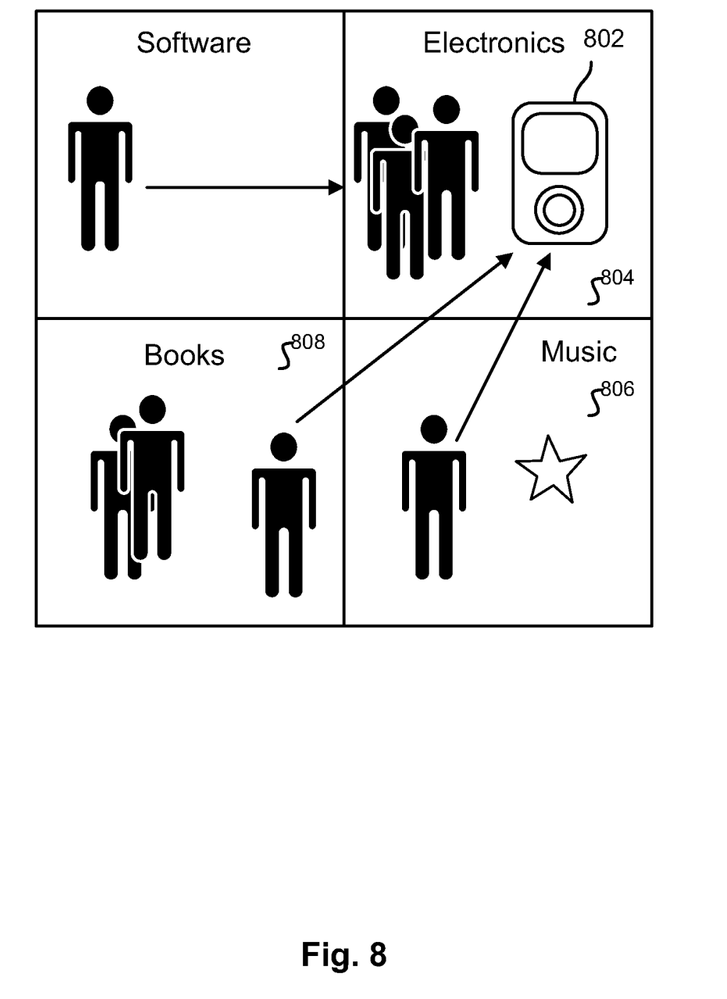
FIG. 8 illustrates an embodiment of an interface to an online store.

FIG. 8 illustrates an embodiment of an interface to an online store. The example shown is an implementation of region 112 of FIG. 1 as rendered in a browser. Suppose a new product has just been made available for purchase in the store. In the example shown, product image 802 is shown in a representation of the Electronics department in region 804. As customers in other parts of the store, such as Music (806) and Books (808) learn about the product and are drawn to it, their interested is indicated by their respective icons moving into region 802. Products may also be highlighted for other reasons. For example, if an author has been invited to participate in a live chat hosted by the Acme store, an icon of the book may appear in region 808 alerting customers (in all departments) that a special event is occurring. Similarly, time-limited specials such as a discount on a product to the next ten purchasers or a promotion lasting for the next thirty minutes can be presented in interface 112 and the excitement of visitors about those promotions can be conveyed to other visitors such as Alice through interface 112.

Figure 9:
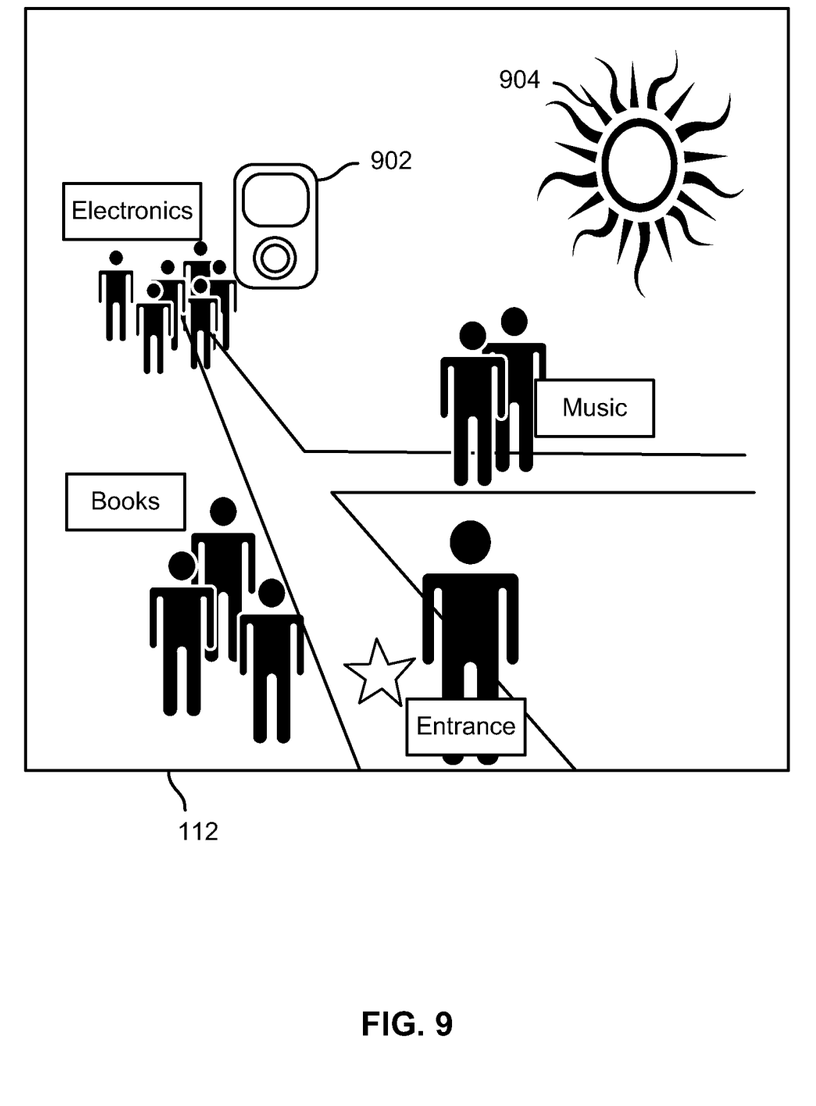
FIG. 9 illustrates an embodiment of an interface to an online store.

FIG. 9 illustrates an embodiment of an interface to an online store. The example shown is an implementation of region 112 of FIG. 1 as rendered in a browser. As in the example shown in FIG. 8, a product such as product 902 is the subject of a special promotion. In the example shown, environmental/atmospheric indicators are also included. Alice is visiting the Acme website at noon. Accordingly, a sun (904) is included in region 112. If Alice were to return later in the day, a moon or star icon might be shown instead of sun 904. Other indicators, such as different color schemes during the fall season or winter holidays can also be included.

Figure 10:
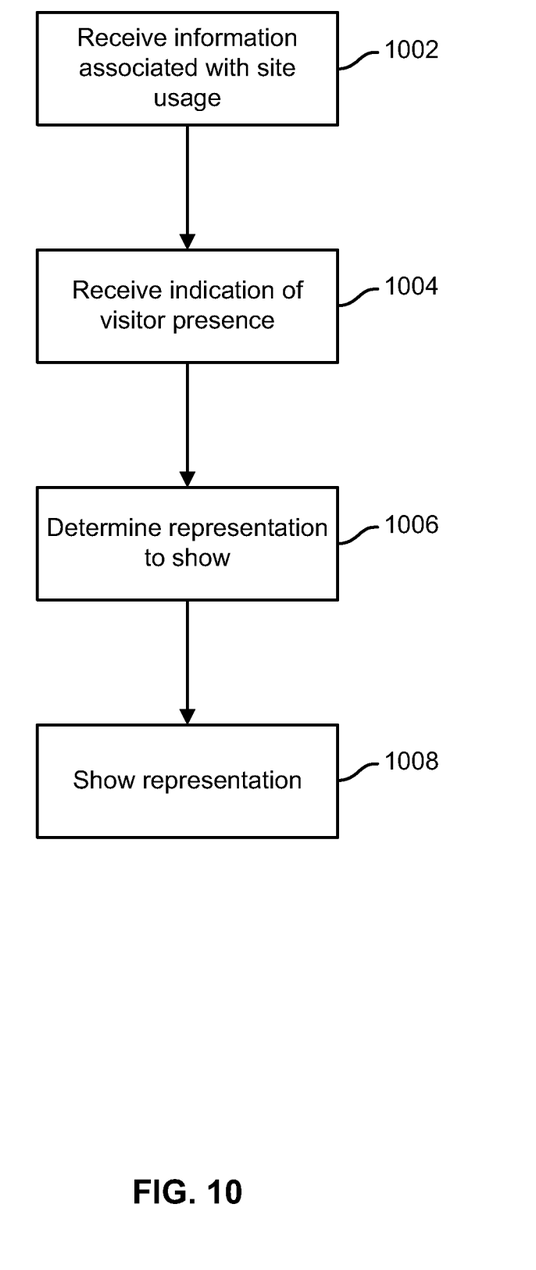
FIG. 10 is a flow chart illustrating an embodiment of a process for representing activity in an online store.

FIG. 10 is a flow chart illustrating an embodiment of a process for representing activity in an online store. In some embodiments, at least portions of the processing shown in FIG. 10 are performed multiple times throughout the duration of a particular visitor's visit to the Acme website. In the example shown, the process begins at 1002 when information associated with site usage is received. For example, at 1002 information such as the number of people checking out of the store, the items in their baskets, which pages other visitors are viewing, etc., is received. In some embodiments, the received information will be used in realtime. In various embodiments, the information received at 1002 is stored and aggregated with other information.

At 1004, an indication of the presence of a visitor is received. For example, when Alice loads the main page of the Acme website in her browser, an indication of her presence on that page is received at 1004.

At 1006, one or more representations (e.g., including a portion of the information received at 1002) to show to the visitor whose presence was detected at 1004 is determined. As described above, what information to show may depend on a variety of factors such as site privacy policies, the nature of the online store, user preference, system resources, etc. What information to show may also depend on factors such as in what part of the store the visitor is currently located, whether they are idle, what their demographics are, etc. In some embodiments, the representation may be based at least in part on information collected at 1002 at an earlier time or may be artificially created. For example, suppose a special event such as a product announcement or the presence of an author generated a lot of activity and interest at the online store at noon. If Alice was away from her computer at that time, she could nonetheless experience the "buzz" by interacting with a replay of that activity in region 112.

At 1008, a representation of site usage is displayed, such as in region 112 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of representing activity in an online store comprising:
   receiving, by a processor, an indication that a first visitor is accessing a first region of a website that corresponds to a first region of the online store;
   simultaneously displaying to the first visitor:

a graphical representation that includes a depiction of the first region of the online store as an element of a web page associated with the first region, and a depiction of an additional region of the online store including a graphical representation of activities of one or more other visitors to the online store, wherein the graphical representation of the activities of the one or more other visitors includes an indication of what items the one or more other visitors are viewing; and generating, by a processor in response to a selection of a portion of the graphical representation associated with one of the first region and the additional region of the online store, graphical representations of a plurality of subsections associated with the selected region, the plurality of subsections including a graphical representation of the activities of one or more other visitors to the subsections.

2. The computer-implemented method of claim 1 wherein the representation includes images.

3. The computer-implemented method of claim 1 wherein the representation includes text.

4. The computer-implemented method of claim 1 wherein the representation includes an animation.

5. The computer-implemented method of claim 1 wherein the representation includes a sound.

6. The computer-implemented method of claim 1 wherein the representation is dynamic.

7. The computer-implemented method of claim 1 wherein the graphical representation of the activities of the one or more other visitors includes an indication of what items the one or more other visitors are viewing.

8. The computer-implemented method of claim 1 wherein the graphical representation of the activities of the one or more other visitors includes an indication of what items a second visitor has in a shopping cart.

9. The computer-implemented method of claim 1 wherein the graphical representation of the activities of the one or more other visitors includes an indication of what items the one or more other visitors have purchased.

10. The computer-implemented method of claim 1 wherein the representation can be customized by the first visitor.

11. The computer-implemented method of claim 1 wherein the representation depends at least in part on where the first visitor is within the store.

12. The computer-implemented method of claim 1 wherein the representation is interactive.

13. The computer-implemented method of claim 1 wherein the representation is interactive and interacting with the representation is part of a promotion.

14. The computer-implemented method of claim 1 wherein the representation is configured to permit the first user to contact a selected one or more of said one or more other visitors.

15. The computer-implemented method of claim 1 wherein the representation is configured to permit the first user to replicate the activity of a selected one of said one or more other visitors.

16. A system for representing activity in an online store, including:

a processor; and a memory coupled with the processor, wherein the memory is configured to provide the processor with instructions which when executed cause the processor to:

receive an indication that a first visitor is accessing a first region of a website that corresponds to a first region of the online store;

simultaneously display to the first visitor, as an element of a web page associated with the first region:

a graphical representation that includes a depiction of the first region of the online store and a depiction of an additional region of the online store;

include in said depiction of the additional second region, a graphical representation of activities of one or more other visitors to the online store, wherein the graphical representation of the activities of the one or more other visitors includes an indication of what items the one or more other visitors are viewing; and generate, in response to a selection of a portion of the graphical representation associated with one of the first region and the additional region of the online store, graphical representations of a plurality of subsections associated with the selected region, the plurality of subsections including a graphical representation of the activities of one or more other visitors to the subsections.

17. The system of claim 16 wherein the graphical representation of the activities of the one or more other visitors includes an indication of what items the one or more other visitors are viewing.

18. The system of claim 16 wherein the graphical representation of the activities of the one or more other visitors includes an indication of what items a second visitor has in a shopping cart.

19. The system of claim 16 wherein the graphical representation of the activities of the one or more other visitors includes an indication of what items the one or more other visitors have purchased.

20. A computer program product for representing activity in an online store, the computer program product being embodied in a non-transitory computer readable storage medium and comprising computer instructions for:

receiving an indication that a first visitor is accessing a first region of a website that corresponds to a first region of the online store;

simultaneously displaying to the first visitor:

a graphical representation that includes a depiction of the first region of the online store as an element of a web page associated with the first region, and a depiction of an additional region of the online store and including a graphical representation of activities one or more other visitors to the online store, wherein the graphical representation of the activities of the one or more other visitors includes an indication of what items the one or more other visitors are viewing; and generating, in response to a selection of a portion of the graphical representation associated with one of the first region and the additional region of the online store, graphical representations of a plurality of subsections associated with the selected region, the plurality of subsections including a graphical representation of the activities of one or more other visitors to the subsections.

* * * * *